(12) United States Patent
Varela et al.

(10) Patent No.: US 8,473,012 B2
(45) Date of Patent: Jun. 25, 2013

(54) ARCHITECTURE OF A MULTIMEDIA AND HANDS-FREE PHONE EQUIPMENT FOR A MOTOR VEHICLE

(75) Inventors: Simao Borges Varela, Saint-Ouen (FR); Antoine Loizeau, Paris (FR)

(73) Assignee: Parrot, Paris (FR)

( * ) Notice: Subject to any disclaimer, the term of this patent is extended or adjusted under 35 U.S.C. 154(b) by 45 days.

(21) Appl. No.: 13/342,856

(22) Filed: Jan. 3, 2012

(65) Prior Publication Data

US 2012/0172087 A1 Jul. 5, 2012

(30) Foreign Application Priority Data

Jan. 4, 2011 (FR) ...................................... 11 50055

(51) Int. Cl.
*H04M 1/00* (2006.01)
(52) U.S. Cl.
USPC .................................... 455/569.2; 455/556.1
(58) Field of Classification Search
USPC ............ 455/569.2, 556.1, 575.9, 3.06; 701/1, 701/36
See application file for complete search history.

(56) References Cited

U.S. PATENT DOCUMENTS

| | | | | |
|---|---|---|---|---|
| 6,993,367 B2 * | 1/2006 | Yamato et al. | ............. | 455/569.2 |
| 7,308,289 B2 * | 12/2007 | Sychta | ........................ | 455/569.1 |
| 7,349,722 B2 * | 3/2008 | Witkowski et al. | ........ | 455/569.2 |
| 7,689,255 B2 * | 3/2010 | Kurauchi et al. | .......... | 455/569.2 |
| 8,190,214 B2 * | 5/2012 | Kimura et al. | ................ | 455/567 |
| 8,395,522 B2 * | 3/2013 | Kweon | ........................ | 340/670 |
| 2010/0305807 A1 | 12/2010 | Basir et al. | | |
| 2011/0257973 A1 * | 10/2011 | Chutorash et al. | ............ | 704/235 |

FOREIGN PATENT DOCUMENTS

FR 2878394 A1 5/2006
WO 2009073806 A2 6/2009

* cited by examiner

*Primary Examiner* — Sonny Trinh
(74) *Attorney, Agent, or Firm* — Haverstock & Owens LLP

(57) ABSTRACT

The equipment comprises a pilot box (10) mounted on the dashboard, an offset box (12) and a link (14) for coupling these boxes. The pilot box comprises a signal processing and equipment control digital processor (18) and, coupled to this processor, an information display screen (20), means for applying user commands, and means (26) of wireless coupling with a remote phone (28). The offset box (12) comprises an audio amplifier (52) and a power supply (46) linked to the vehicle electrical network (48). The coupling link is consisted of a bidirectional digital bus adapted to convey concurrently digital signals and power supply currents. The offset box comprises an audio codec (56) coupling the digital bus to the audio amplifier, and an interconnection arrangement (38, 50, 58, 60, 64) for the wire connection to a plurality of peripheral devices (40, 42, 44, 62, 68, 72) of the equipment.

10 Claims, 2 Drawing Sheets

ARCHITECTURE OF A MULTIMEDIA AND HANDS-FREE PHONE EQUIPMENT FOR A MOTOR VEHICLE

The invention relates to electronic equipments used in motor vehicles and liable, among other things, to be coupled to a portable phone to provide a "hands-free" operation of the latter.

More particularly, it relates to equipments intended to be installed as "aftermarket equipments" in a vehicle and that are therefore not originally integrated in the latter.

The equipment is added to the vehicle to provide features that did not exist originally; it may also be to replace an existing equipment by another one which has more extended features, or which is more efficient and versatile.

The FR 2 878 394 A1 (Parrot) describes such an equipment comprising two distinct boxes, referred to as "digital box" and "analog box". The digital box is arranged within the reach of the driver, comprises control buttons (pick up/hang up, volume control, etc.) and incorporates a microcontroller and a microphone for hands-free phone calls and voice recognition. The analog box is placed in a cigar-lighter socket of the vehicle, and includes a voltage regulator, an audio amplifier and an integrated loud-speaker. The two boxes are linked by a multiconductor cable comprising an audio signal line, a power supply line, a mute line for deactivating the audio amplifier, used for example when no phone is detected within the environment of the adapter, and possibly a pilot wire for returning, to the power supply circuit located in the analog box, the feedback of the digital box voltage regulator in order to compensate for the impedance losses in the linking cable. Furthermore, it is a simple equipment of the plug-and-play type (ready to be plugged), which can be plugged into the cigar-lighter socket, but cannot be connected to other elements of the vehicle, in particular the audio equipment (loud-speakers distributed in the vehicle, radio, CD player, etc.). However, the arrival of new generations of equipments integrating more and more features and controls generates difficulties for implementing equipments made according to this principle.

Indeed, the new-generation equipments generally integrate the possibility to couple the audio amplifier to a reproducing device such as a portable music player, or to an audio data storage medium such as a "USB key" or a SD card, or the like. It is then necessary to provide the user with browsing controls such as: next song/previous song, next track/previous track, etc. (the "tracks" corresponding to different directories on the medium, in which are stored the various files corresponding to the "songs"). Secondly, more and more vehicles are originally provided—thus as an original equipment—with steering-wheel control buttons, and it is essential that the user can be proposed to control the aftermarket equipment by means of these buttons (volume up/down, audio source selection, next song/previous song, etc.).

Such developments generate a multiplication of wire connections between the two boxes, with typically:
 two power supply wires,
 four wires for the audio signals (two audio in wires, two audio out wires),
 a wire harness corresponding to the various respective steering-wheel control buttons,
 plus various wires for the management of general functions such as the vehicle ignition key position detection, the lighting system control, etc.

Such requirements generate a significant increase of the diameter and stiffness of the cable linking the two boxes, which becomes unsuited for a satisfactory installation—especially because the digital box is in principle adapted to be removable, and must therefore be easily disconnectable. Furthermore, in its visible part protruding from the dashboard, the large-diameter cable creates a rather negative impression about the product's aesthetic appearance.

Finally, the passage of a multiplicity of wires in a same cable creates a high risk of deterioration of the audio link quality by generating noise therein, except if shield wires are used, which would further increase the size and the production cost of the cable.

The object of the invention is to overcome these difficulties and limitations, by proposing a new architecture of equipment that is compliant with a multiplication of features of such equipment, while limiting the number and size of visible cables emerging from the dashboard.

Another object of the invention is to provide an audio link particularly robust to external disturbances, of which it is well known that it is particularly difficult to protect from in the environment of a motor vehicle.

For that purpose, the invention proposes an equipment for a motor vehicle of the general type disclosed in the above-mentioned FR 2 878 394 A1, i.e. an equipment comprising a pilot box adapted to be removably attached to the vehicle dashboard, near the driver, an offset box distinct from the pilot box and adapted to be mounted in the vehicle, remote from the pilot box, and a link for coupling the pilot box to the offset box.

The pilot box comprises a signal processing and equipment control digital processor, and, coupled to this processor, an information display screen, means for applying user commands, and means of wireless coupling with a remote phone. The offset box comprises an audio amplifier adapted to be linked to a loud-speaker located in the passenger compartment, and a power supply adapted to be linked to the vehicle electrical network.

According to a characteristic of the invention, the coupling link is consisted of a bidirectional digital bus adapted to convey concurrently digital signals and power supply currents. The pilot box further comprises an interface coupling the processor to the digital bus. The offset box further comprises an audio codec coupling the digital bus to the audio amplifier, and an interconnection arrangement for wire connection to a plurality of peripheral devices of the equipment. The power supply is adapted to supply (i) directly the offset box circuits, and (ii) indirectly, via the digital bus, the pilot box circuits.

According to various advantageous subsidiary characteristics:
 the coupling link is a link of the USB bus type, possibly with a dual USB bus;
 the offset box comprises an audio codec for coupling the digital bus to a microphone located in the passenger compartment;
 the equipment comprises a remote-control unit, the means of the pilot box for applying user commands including a receiver of radio signals emitted by the remote-control unit;
 the offset box comprises an interface for coupling to control buttons arranged on a steering wheel of the vehicle;
 the offset box comprises an interface for coupling to a car radio or a vehicle-borne audio system;
 the offset box comprises a dispatcher, coupled on the one hand to the digital bus and on the other hand to a plurality of sockets adapted to receive peripheral devices directly connectable to the digital bus;
 the pilot box further comprises, coupled to the processor, a receiver of GPS satellite positioning signals;

the display screen of the pilot box is a touchscreen, and the means of the pilot box for applying user commands comprise means for decoding contacts applied to the touchscreen by a user.

An exemplary embodiment of the device of the invention will now be described, with reference to the appended drawings in which the same reference numbers designate functionally identical elements through the figures.

The equipment of the invention described in the figures is mainly consisted of a first box 10, referred to as the "pilot box", and a second box 12, referred to as the "service box", linked by a wire coupling link 14. To these boxes is added a remote control 16, coupled to the pilot box 10 by a wireless link.

The pilot box 10 is arranged within the immediate reach of the vehicle driver, so that, in particular, the screen thereof can be viewed by the driver and be within the reach of the latter. For example, it is mounted on the dashboard by a removable system similar to that serving for attaching the GPS-type devices.

On the other hand, the service box 12 is permanently mounted remote from the pilot box, at a location that does not need to be easily accessible, for example in a glove compartment or under the dashboard of the vehicle.

The remote control 16 is mounted on the steering wheel by a suitable attaching system, or on a support stuck to the dashboard, within the reach of the driver. The remote control 16 makes it possible to send commands such as: pick up/hang up (for the phone functions), source selection, sound volume up/down, and song list browsing (next song/previous song, next track/previous track, fast forward/fast rewind).

Figure 2:
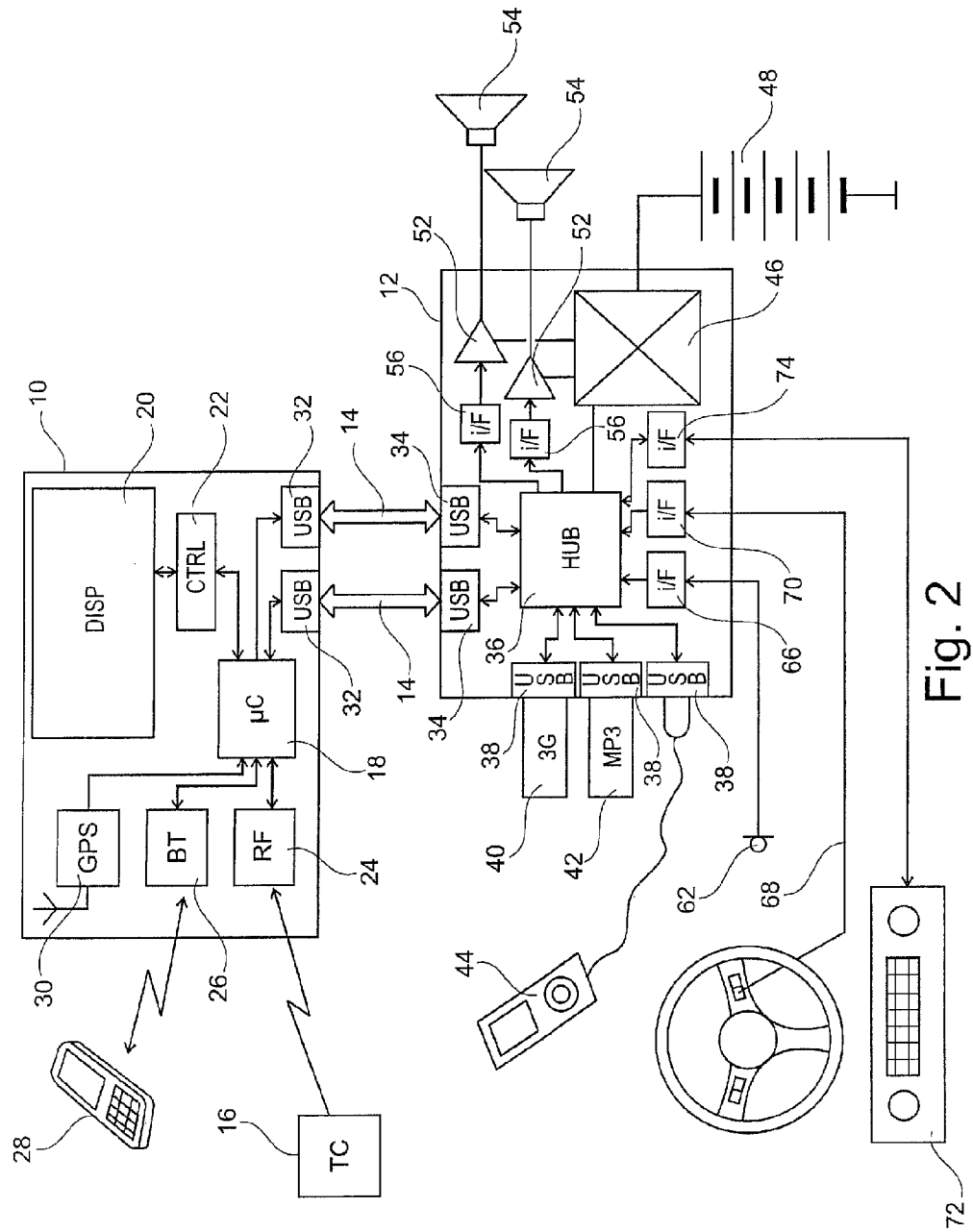
FIG. 2 illustrates, as a block diagram, the different constitutive parts of the equipment of the invention and the different devices to which the latter can be coupled.

As illustrated in FIG. 2, the pilot box 10 incorporates a versatile digital processor 18 for processing the signals and controlling the whole equipment. For example, a microcontroller of the OMAP (Open Multimedia Application Platform) type, such as the OMAP 3630 developed by Texas Instruments, may be used, which makes it possible to control and program multiple functions of audio-stream management and the algorithms for the audio processing of music and voice (for the telephony), with voice recognition, noise reduction, anti-echo, etc., as well as the algorithms for managing the data coming from the remote control.

The pilot box also comprises a display screen 20, advantageously a panel with a touch interface further allowing the user to input commands. The display screen 20 is coupled to the processor 18 by a touch-panel controller 22.

The microcontroller 18 is also coupled to a radiofrequency receiver 24 that receives the data from the remote control 16, for example on the 433 MHz frequency band.

The microcontroller 18 is also coupled to a circuit 26 for managing a bidirectional wireless link with a portable phone 28, in accordance to the Bluetooth requirements (Bluetooth is a registered trademark of Bluetooth SIG, Inc.), and remotely controlling all the functions of this phone: picking up, hanging up, dialing, menu browsing, selecting from a directory, etc. Advantageously, the microcontroller 18 is also coupled to a GPS receiver module 30 for managing and displaying satellite positioning information on the display screen 20.

Finally, the microcontroller 18 is coupled to at least one USB interface 32 for ensuring the link with the service box 12 via a bidirectional digital wire coupling (conventional USB bus). In the example illustrated, the coupling is provided by two linking buses used in parallel because of the significant volume of signals to be exchanged between the pilot box 10 and the service box 12, but in case this volume is smaller, it is possible to transfer all the signals on a single bidirectional USB link.

It will be noted that, on the one hand, the pilot box 10 has not its own power supply and that, on the other hand, its interconnection arrangement is reduced at the minimum, i.e. the USB interface(s) 32. Moreover, the pilot box 10 is the one that integrates all the intelligence of the product insofar as, as it will be seen hereinafter, the service box 12 comprises no digital processing circuit (no microcontroller).

The service box 12 is indeed essentially dedicated to the management of the equipment power supply and to the provision of an enhanced interconnection arrangement; it further includes the analog audio stages of power amplification for the vehicle audio system.

The service box 12 comprises at least one USB port 34 (in the example illustrated, two USB ports 34) for the link 14 of coupling with the pilot box 10. Such USB port(s) 34 are duplicated by a USB dispatcher or hub 36, so as to have on the service box 12 a plurality of additional USB sockets 38 for connecting, for example:

a "3G key" providing a wireless internet access to specialized sites, for example for the access to a streaming Internet radio service or to an on-demand music service;

a data medium, for example a "USB key" 42 containing compressed music files (MP3 or others), grouped in various directories; and/or an portable music player 44, connected to the service box by a USB plug and also containing audio files stored in various directories.

The service plug 12 further includes a power supply module 46 linked to the vehicle electrical network (battery or alternator) and provided with the usual functions for voltage regulation and stabilization, anti-interference, etc. This power supply module 46 delivers to the dispatcher 36 a regulated voltage for supplying indirectly, via the USB link(s) 14, the pilot module 10 that has not its own power supply means. It will be noted that the power supply can be delivered by this way to all the devices connected to the interconnection arrangement of the service box, for example to the 3G key 40 for making it operate, to the portable music player 44 for making it operate and for recharging it, etc. The module 46 also directly supplies the various circuits located in the service box 12.

Figure 1:
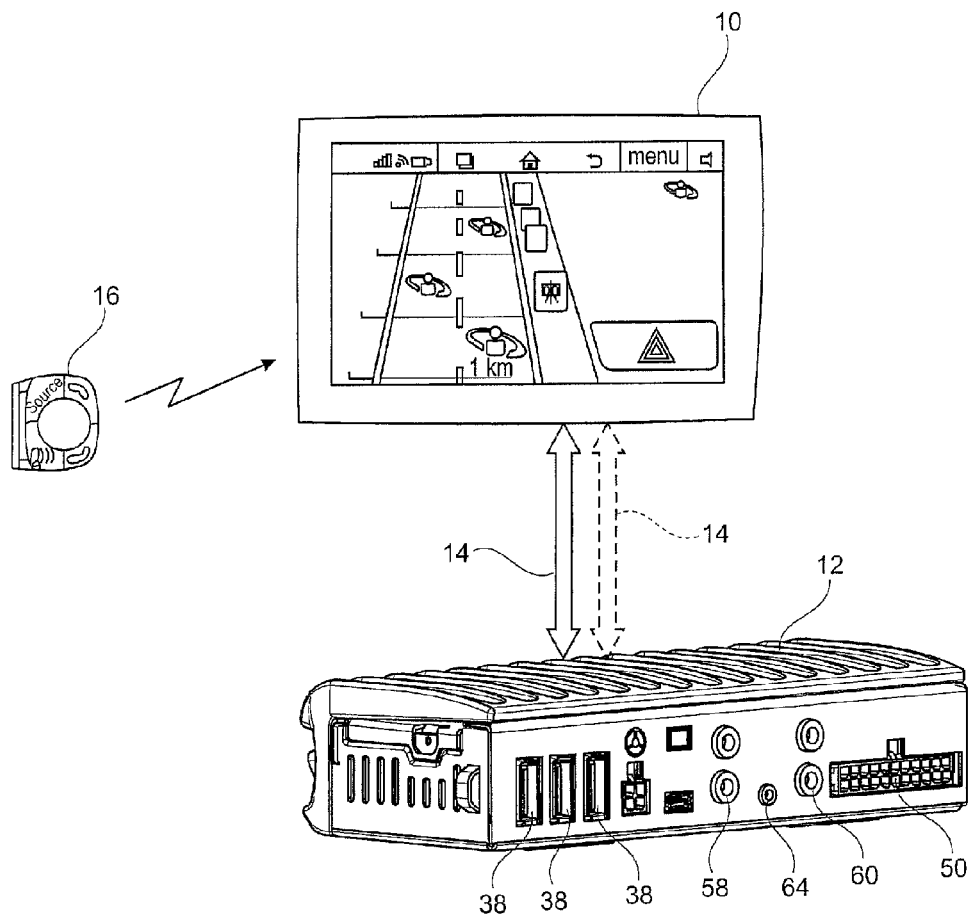
FIG. 1 is a schematic view of the main elements of the equipment of the invention.

The connection of the power supply module 46 to the vehicle electrical network is made via a socket 50 (FIG. 1) receiving a suitable connector linked to a standardized wire harness (ISO automotive interconnection systems) supplying the various elements permanently mounted in the vehicle: power supply network, loud-speakers, steering wheel control buttons, car radio, etc.

The service box 12 also includes audio power circuits, in particular the LF power amplifiers 52 intended to be linked, via the socket 50, to respective loud-speakers 54 permanently installed in the vehicle. Such amplifiers 52 receive as an input an analog signal coming from the USB bus and delivered by interfaces 56 (audio codecs).

The non-amplified analog audio signals can also be accessed via a line in terminal 58 and a line out terminal 60 (FIG. 1), accessible on the external face of the service box 12.

The service box 12 is also linked to a microphone 62 mounted at a suitable location in the vehicle, connected to a socket 64 (FIG. 1) of the service box and coupled to the bus 14 of coupling to the pilot box 10 via a USB interface 66 (audio codec) and the dispatcher 36. The service box 12 is also linked to a link 68 leading to control buttons integrated to the steering wheel of the vehicle. This link is coupled to the bus 14 of coupling to the pilot box 10 via the standardized socket 50, a USB interface 70 (input/output management GPIO interface), and the dispatcher 36.

Finally, the pilot box 10 may possibly be linked to a car radio 72 or to another audio/video device, via the USB interface 74 and the standardized socket 50.

Therefore, the peripheral devices that are coupled to the equipment (loud-speakers 54, 3G key 40, USB key 42, portable music player 44, microphone 62, steering-wheel control buttons 68 and car radio 72) are all coupled via the interconnection arrangement of the service device 12, which further provides a common coupling of all these peripheral devices to the pilot box 10, via the USB digital bus 14.

The pilot box 10 is thus provided, as an interconnection arrangement, with only the USB socket(s) 32 for the connection to the bus 14, and hence lets appear only one (or two) USB cables, that may be easily hidden and that do not represent an aesthetic problem.

Moreover, this simplification of the wire interconnection arrangement at the pilot box 10 makes it easier to disconnect and remove this box, such operations being frequent because it is not desirable to leave the box in place when the vehicle is parked for a long time.

The pilot box 10 permits to control directly, via the touchscreen 20 or via the remote control 16, a multiplicity of functions, such as:
 "hands-free" operation of the phone: call emission and reception, directory synchronization, voice control (the voice commands being detected by the microphone 62), etc.
 music playing from:
  the USB key 42, with possibility to access to the detailed content of the latter and to browse the various directories where the music files are stored,
  the portable music player 44, with the same possibility to access to the detailed content and to browse the directories,
  the auxiliary input 58,
  an Internet radio service via the 3G key 40,
  an on-demand music service, also via the 3G key, etc.,
  generally, possibility to access to any type of service requiring an internet connection,
 drive assistance via the GPS navigation receiver 30.

The link via the USB bus 14 allows bidirectional circulation of the audio signals, control of the GPIO interfaces for the state and control input-output signal management, communication with the steering-wheel control push-buttons, etc.

On the other hand, because the audio signals are digitally exchanged between the pilot box 10 and the service box 12, the link between these two boxes is particularly robust to the external disturbances of the audio signals, even with reduced diameter cable.

The invention claimed is:

1. A multimedia and hands-free phone equipment for a motor vehicle, comprising:
 a) a pilot box (10), adapted to be removably attached to the vehicle dashboard, near the driver, comprising:
  a signal processing and equipment control digital processor (18); and, coupled to said processor:
  an information display screen (20);
  means for applying user commands; and
  means (26) of wireless coupling with a remote phone (28),
 b) an offset box (12), distinct from the pilot box and adapted to be mounted in the vehicle, remote from the pilot box, and comprising:
  an audio amplifier (52) adapted to be linked to a loudspeaker (54) located in the passenger compartment; and
  a power supply (46), adapted to be linked to the vehicle electrical network (48), and
 c) a link (14) for coupling the pilot box to the service box, said equipment being characterized in that:
  the coupling link is consisted of a bidirectional digital bus adapted to convey concurrently digital signals and power supply currents;
  the pilot box further comprises an interface (32) coupling the processor to the digital bus; and
  the offset box further comprises:
   an audio codec (56) coupling the digital bus to the audio amplifier; and
   an interconnection arrangement (38, 50, 58, 60, 64) for wire connection to a plurality of peripheral devices (40, 42, 44, 62, 68, 72) of the equipment, and
  the power supply is adapted to supply (i) directly the offset box circuits, and (ii) indirectly, via the digital bus, the pilot box circuits.

2. The equipment of claim 1, wherein the coupling link is a link of the USB bus type.

3. The equipment of claim 2, wherein the coupling link comprises a dual USB bus.

4. The equipment of claim 1, wherein the offset box further comprises an audio codec (66) for coupling the digital bus to a microphone (62) located in the passenger compartment.

5. The equipment of claim 1, wherein the equipment further comprises:
 d) a remote-control unit (16),
 the means of the pilot box for applying user commands including a receiver (24) of radio signals emitted by the remote-control unit.

6. The equipment of claim 1, wherein the offset box further comprises an interface (70) for coupling to control buttons arranged on a steering wheel of the vehicle.

7. The equipment of claim 1, wherein the offset box further comprises an interface (74) for coupling to a car radio (72) or a vehicle-borne audio system.

8. The equipment of claim 1, wherein the offset box further comprises a dispatcher (36), coupled on the one hand to the digital bus and on the other hand to a plurality of sockets (38) adapted to receive peripheral devices (40, 42, 44) directly connectable to the digital bus.

9. The equipment of claim 1, wherein the pilot box further comprises, coupled to the processor, a receiver (30) of GPS satellite positioning signals.

10. The equipment of claim 1, wherein:
 the display screen (20) is a touchscreen; and
 the means of the pilot box for applying user commands comprise means (22) for decoding contacts applied to the touchscreen by a user.

* * * * *